United States Patent Office 3,268,394
Patented August 23, 1966

3,268,394
METHODS FOR CONTROL OF VASCULAR FUNGUS DISEASE OF TREES
Edward D. Weil, Lewiston, Edwin Dorfman, Grand Island, and Jerome Linder, Niagara Falls, N.Y., assignors to Hooker Chemical Corporation, Niagara Falls, N.Y., a corporation of New York
No Drawing. Filed Oct. 17, 1962, Ser. No. 231,296
41 Claims. (Cl. 167—30)

This application is a continuation-in-part of application Serial No. 141,268, now forfeited, filed September 26, 1961, and of Serial No. 128,945, filed August 3, 1961, now forfeited, which is a continuation-in-part of Serial No. 754,707, filed August 13, 1958, now United States Patent 3,009,806.

This invention comprises novel and effective methods for the control and prevention of the destruction of valuable trees by pathogenic fungal organisms. In particular, the invention comprises methods for the prophylaxis and retardation of vascular tree diseases caused by fungi, by the introduction of certain chemotherapeutic substances into the tissue and sap stream of the trees. Vascular tree diseases controlled by the method of this invention include Dutch elm disease, oak wilt (*Ceratocystis fagacearum*), canker diseases, Verticillium wilts, and others.

The Dutch elm disease was discovered in the United States in 1930. Since then, it has spread rapidly and now covers almost the entire range of the American elm. Unchecked, the disease shows promise of rendering substantially extinct this valuable and attractive shade tree, of which there are still an estimated one billion specimens in the United States. Many localities have lost most of their population of shade trees and have been obliged to go to great expense to remove the dead or dying elms. The economic, as well as aesthetic loss, has become a matter of great concern to municipalities and private landowners.

The Dutch elm diseases is caused by a fungus, *Ceratostomella ulmi* (also sometimes named as *Ceratocystis ulmi*) which, when introduced into the water-conducting vessels of the tree, multiplies rapidly therein, causing the leaves to wilt and the tree therefore to die. The disease is introduced into healthy elms by elm bark beetles which feed on twigs and on small branches. The beetles pass the winter as larvae or grubs in the bark of dead elms. In early spring, the winged adults emerge, infested with spores of the fungus, and fly to living elm trees where they bore into twigs to feed, thereby introducing the fungal spores into the new host tree.

Once in the host elm, the fungus gradually or sometimes rapidly spreads throughout the vascular system of the tree, causing its inevitable death. The mechanism by which the fungus kills the tree is not well understood; the damage caused by the fungus may involve toxins produced by the fungus, disruption of the normal biochemistry of the tree, or mechanical blockage of the vascular tissue, or a combination of these causes.

Efforts to control Dutch elm disease have been hitherto quite unsatisfactory. Such attempted control measures may be summarized as follows:

(1) Prevention of infestion by control of the elm bark beetle. Spraying of healthy elms with DDT or other insecticides has been conducted by municipalities. However, such sprays are expensive, difficult to apply at the proper time, present a hazard to birds, and have proved relatively ineffective in preventing the spread of the disease.

(2) Fungicides: Fungicides applied to the surface of the tree are without effect on the disease since it is present in the vascular tissue of the tree. Few systemic fungicides are known, and these few have been found ineffective against *Ceratostomella ulmi*.

(3) Sanitation measures: These involve the deliberate removal and destruction of dead and dying elms to eliminate breeding places for the elm bark beetle. When conscientiously conducted, this method has been fairly effective in reducing the rate of spread of the disease, but involves substantial cost ($100 per tree is not unusual), constant supervision, large expenditure of manpower, difficult legal problems in enforcement, and constant cooperation from private landowners. Such sanitation programs have proved beyond the means of most municipalities, and are practically out of the question in rural areas. Since the beetles can fly considerable distances, infected trees outside municipal jurisdiction can easily serve as reservoirs of re-infection. These and other difficulties have led experts to state that "control of the Dutch elm disease is a unique and baffling problem" (Cornell extension bulletin 932, page 1).

The use of chemotherapy has been suggested in general terms as a feasible approach for combatting the Dutch elm disease, but no successful chemotherapeutants have been hitherto found. Most efforts in regard to chemotherapeutants have been directed toward finding compounds which would be both systemic and fungitoxic, and these efforts have failed.

Oak wilt is caused by a Ceratocystis fungus and has a related etiology, and presents similar problems of control.

It was surprising and unexpected to find that an effective method of chemotherapy of vascular tree diseases, such as Dutch elm disease, oak wilt and others, was possible using certain compounds not inherently fungicidal in nature. It was further surprising and unexpected to discover that tree chemotherapy could be conducted safely with certain compounds closely related to known herbicides or even with certain compounds having herbicidal activity toward annual plant species. It was further surprising to find chemotherapeutants capable of wide latitude in methods of application, and useful at very low rates of application.

The method of the invention consists of applying to viable trees, i.e., healthy trees prior to infection or after infection but prior to onset of disease symptoms in a major proportion of the tree's branches, chemotherapeutic amounts of the compounds described below:

The compounds used in the method of the invention may be broadly characterized as amino- and nitrohalobenzoic acids and amino- and nitrohalophenylacetic acids which may be unsubstituted or substituted, and hydrolylzable derivatives thereof.

Specifically, the compounds used in the method of the invention are described by the formula $$Y_p \underset{Z_q}{\overset{X_m}{\bigotimes}} \left( \overset{A}{\underset{B}{C}} \right)_n - COOH$$

wherein A is chosen from group consisting of hydrogen, halogen, lower alkoxy, hydroxy, lower alkyl, and keto (that is a double-bonded ketonic oxygen concurrently with B), B is chosen from group consisting of hydrogen, halogen, lower alkoxy and keto (that is, concurrently with A, a double-bonded ketonic oxygen), $n$ is an integer from zero to one, X is a halogen, the X groups, where plural, being the same or different halogens, $m$ is an integer from 1 to 4, Y is chosen from the group consisting of nitro, amino, acylamino, lower alkyl-substituted amino, furfurylamino, benzylamino, and hydroxylamino, $p$ is an integer from 1 to 2, Z is chosen from the group consisting of lower alkyl, lower alkoxy, lower alkylmercapto and phenoxy, and $q$ is an integer from zero to two. The sum of $m$, $p$, and $q$ must not exceed five. Furthermore, the salts of said acids, and hydrolyzable derivatives of said acids such as the esters, amides, anhydrides, thioesters, thioamides, thioanhydrides, halides, nitriles, amidines, imides, iminoesters and imidothioesters, are usable in the method of the invention, since they will all become converted by hydrolysis to the active acid or its active anion.

Examples of chemicals within the broadest scope of the invention include nitro-2,3,6,α-tetrachlorophenylacetic acid,
5-amino-2,3,6-trichloro-alpha-methoxyphenylacetic acid,
nitrodichloromandelic acid,
3-amino-2,5-dichlorobenzoic acid,
3-nitro-2,5-dichlorobenzoic acid,
3-amino-2,5-dichloromandelic acid,
2-(5-amino-2,3,6-trichlorophenyl) propionic acid,
nitro-trichloro-alpha-ketophenylacetic acid,
nitro-2,4,5,
alpha,
alpha-pentachlorophenylacetic acid,
4-amino-2,3,5-triiodobenzoic acid,
3-amino-2,6-dichloro-5-fluorobenzoic acid,
5-amino-2,3,4,6-tetrachlorobenzoic acid,
2-chloro-3-amino-6-nitrophenylacetic acid,
5-formylamino-2,3,6-trichlorophenylacetic acid,
5-methylamino-2,3,6-trichlorophenylacetic acid,
N-butyl-aminodichlorobenzoic acid,
3-(N-methylamino)-2,5-dichlorobenzoic acid,
3-(N-furfurylamino)-2,5-dichlorobenzoic acid,
3-(N-benzylamino)-2,5-dichlorobenzoic acid,
3-hydroxylamino-2,5-dichlorobenzoic acid,
3,5-diamino-2,6-dichlorobenzoic acid,
3-amino-4,5-dichloro-2-methylbenzoic acid,
5-nitro-3,6-dichloro-2-methylbenzoic acid,
5-nitro-2-methoxy-3,6-dichlorobenzoic acid,
5-amino-2-methoxy-3,6-dichlorobenzoic acid,
aminodichloro-o-toluic acid,
aminodichloro-m-toluic acid,
4-nitro-2-methoxy-3,5,6-trichlorobenzoic acid,
4-amino-2-methoxy-3,5,6-trichlorobenzoic acid,
5-amino-2-methoxy-3,6-dichlorophenylacetic acid,
6-amino-2,3,5,
alpha-tetrachlorophenylacetic acid,
5-amino-2,3,6-trichloro-alpha,
alpha-dimethoxyphenylacetic,
5-amino-2-methoxy-3-chloro-6-methyl-phenylacetic acid,
5-amino-3-methoxy-2,6-dichlorobenzoic acid,
5-amino-2,6-dimethoxy-3-chlorobenzoic acid,
6-amino-2-methoxy-3,5-dibromobenzoic acid,
4-amino-2-methoxy-3,5-dichloro-6-bromobenzoic acid,
3-amino-2-methylmercapto-5,6-dichlorobenzoic acid,
5-amino-2-phenoxy-3,6-dichloro-benzoic acid,
aminotribromophenylacetic acid,
2-amino-3,5-dimethoxy-6-chlorobenzoic acid,
4-amino-2-methoxy-3-methyl-5,6-dichlorobenzoic acid,
4,6-dinitro-2-methoxy-3,5-dichlorobenzoic acid,
4,6-dinitro-2-methoxy-3-methyl-5-chlorobenzoic acid,
4-amino-2-methoxy-5-nitro-3,6-dichlorobenzoic acid, for example, and the salts thereof such as the sodium, potassium, magnesium, calcium, copper, zinc, nickel, cadmium, dimethylammonium, anilinium, piperidinium, pyridinium, hydrazinium, and hydroxylammonium salts, also the esters thereof, such as the methyl, lauryl, methoxyethyl, phenyl, benzyl, or naphthyl esters, and corresponding thioesters, iminoesters, and imidothioesters, also the amides thereof such as the N-unsubstituted amides, and the N-hydrocarbyl-substituted amides such as the N-methylamides, the N,N-diethylamides, the anilides, and the morpholides, and corresponding thioamides and amidines, also the anhydrides and thioanhydrides, also the acid chlorides and bromides thereof, also the nitriles thereof. All of these derivatives are usable insofar as they are all hydrolyzable to the active acids or their active anions, either in the spray solution, in the soil, or in the tree sap.

Within this broad group of compounds usable in the method of the invention, there are subgroups preferred because of high activity, relative safety, and relative ease of manufacture. This preferred group is characterized by the formula

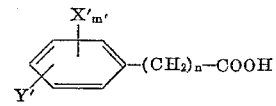

where $n$ is an integer from zero to 1, $X'$ is chosen from bromine and chlorine, $m'$ is a number from 3 to 4, $Y'$ is chosen from the group consisting of nitro and amino, also the salts of said acids, and the esters of said acids. Since the salt will ionize and hydrolyze to yield the active acid and/or its active anion, the scope of the invention extends to any salt. Likewise, any ester will hydrolyze to the acid and therefore any ester can be used in the method of the invention. From the standpoint of convenience in formulation, however, the water-soluble salts and oil-soluble salts are preferred. Such water soluble salts include the alkali metal salts, i.e., lithium, sodium, or potassium, the ammonium salt, the lower hydrocarbyl radical substituted ammonium salts such as the methylammonium, dimethylammonium, trimethylammonium, ethylammonium, diethylammonium, triethylammonium, diisopropylammonium, ethanolammonium, diethanolammonium, triethanolammonium, N-methylmorpholinium, pyridinium, dimethylanilinium, cyclohexylammonium salts and the like. Such oil-soluble salts include the higher hydrocarbyl radical substituted ammonium salts such as the dimethyllaurylammonium, trioctylammonium, di(2-ethylhexyl)ammonium, octadecylammonium salts, and the like.

Examples of compositions within this preferred group for use in the method of the invention include: 5-amino- or 5-nitro-2,3,6-trichlorophenylacetic acid and the sodium, potassium, ammonium, mono-, di-, tri-, or tetramethylammonium, mono-, di-, or triethylammonium, mono-, di-, or tripropylammonium, mono-, di-, or tributylammonium, mono-, di-, or triethanolammonium, dimethyllaurylammonium, N-methylmorpholinium, di-(2-ethylhexyl)ammonium, cyclohexylammonium, 2-chloroethyltrimethylammonium, diallylammonium, pyridinium, and N,N-dimethylanilinium salts thereof. It is also possible to use alkaline earth salts such as the calcium salt or heavy metal salts such as the zinc and copper salts but these are less convenient to formulate. Also, the above acid may be used in the form of its methyl, ethyl, propyl, butyl, methoxyethyl, ethoxyethyl, butoxyethyl, butoxyethoxyethyl and phenyl esters, for example.

Mixed amino- or nitrotrichlorophenylacetic acids and the above-named salts and esters thereof may be used. A particularly inexpensive and effective mixture is that derived by nitration of technical trichlorophenylacetic acid. Such a mixture comprises about 30–75 percent of 5-nitro-2,3,6-, 15–45 percent of 3-nitro-2,4,5-, 5–15 percent of 5-nitro-2,3,4-, and minor amounts of 4-nitro-2,3,6-, 6-nitro-2,4,5-, 6-nitro-2,3,4-, and 3-nitro-2,4,6-trichlorophenylacetic acids. This mixture may be hydrogenated to the corresponding mixed aminotrichlorophenylacetic acids, which are, surprisingly, even more active chemotherapeutically than the parent nitro compounds.

Further examples include 5-nitro (or amino)-2,3,6-trichlorobenzoic acid, 6-nitro (or amino)-2,3,5-trichlorobenzoic acid, 3-nitro (or amino)-2,3-, 2,5-, or 2,6-dichlorobenzoic acid, 6-nitro (or amino)-2,3- or 2,5-dichlorobenzoic acid, and 4-nitro (or amino)-2,3,5,6-tetrachlorobenzoic acid, and salts analogous to those named above.

Mixtures of nitro- or aminotrichlorobenzoic acids are found to be efficacious and inexpensive to manufacture. Nitration of commercial trichlorobenzoic acid containing about 50–80% 2,3,6-trichlorobenzoic acid and 20–50 percent 2,4,5-trichlorobenzoic acid yields a particularly efficaceous mixture containing 50–80 percent 2,3,6-trichloro-4- and 5-nitrobenzoic acid and 20–50 percent 2,4,5-trichloro-3- and 6-nitrobenzoic acid, and this mixture may be reduced by hydrogenation to the corresponding even more active aminotrichlorobenzoic acid. Nitration of a trichlorobenzoic acid mixture containing between about 50 and about 70 percent 2,3,5-trichlorobenzoic acid, between about 5 and about 15 percent 2,4,5-trichlorobenzoic acid and between about 15 and about 25 percent 2,3,6-trichlorobenzoic acid gives a useful nitrotrichlorobenzoic acid which, when hydrogenated, gives an even more highly active aminotrichlorobenzoic acid mixture. Nitration of a commercial "polychlorobenzoic acid" containing typically between about 10 and about 15 percent 2,5-dichlorobenzoic acid, between about 10 and about 20 percent 2,3,5-trichlorobenzoic acid, between about 5 and about 15 percent 2,3,6-trichlorobenzoic acid, between about 1 and about 5 percent 3,4,5-trichlorobenzoic acid, between about 4 and about 8 percent 2,3,4-trichlorobenzoic acid, between about 30 and about 40 percent 2,3,5,6-tetrachlorobenzoic acid, and between about 10 and about 20 percent 2,3,4,5-tetrachlorobenzoic acid yields a useful nitropolychlorobenzoic acid which, when hydrogenated, yields an even more highly active aminopolychlorobenzoic acid.

By nitration of a technical mixed tetrachlorobenzoic acid containing commensurate amounts of 2,3,5,6- and 2,3,4,5-tetrachlorobenzoic acid, a useful mixed nitrotetrachlorobenzoic acid may be prepared which, when hydrogenated, yields a highly active mixed aminotetrachlorobenzoic acid. All of these above named mixed acids can be employed as salts, such as the salts analogous to those named above for 5-amino-2,3,6-trichlorophenylacetic acid.

The mixed aminotrichlorophenylacetic acids described above appear to have the highest margin of safety (ratio of toxic dose to chemotherapeutic dose). The most active component in the mixture, although not believed responsible for all the activity of the mixture, is found to be 5-amino-2,3,6-trichlorophenylacetic acid.

It is a further surprising discovery that the above-named amino compounds have generally a higher level of activity than the corresponding nitro compounds, and a higher ratio of toxic dose to chemotherapeutic dose than the corresponding nitro compounds. Since in direct fungicide tests, nitro compounds are generally more toxic to fungi than corresponding amino compounds, the aforementioned finding constitutes further evidence that the compositions used in the method of the invention do not exert direct toxic action on the fungi but produce their disease preventing or controlling effect by some more subtle mechanism, not understood at present.

It is to be emphasized that the compounds used in the method of the invention are generally not fungicides, per se. When tested in vitro against *Ceratostomella ulmi*, concentrations of 100 parts per million in a nutrient medium are found to produce no inhibition of the growth of the fungus, in tests conducted with nitrotrichlorophenylacetic acid mixture, 2,3,5,6-tetrachloro-4-nitrobenzoic acid, 2,3,5,6-tetrachloro-4-aminobenzoic acid, 2,3,4,5-tetrachloro-6-nitrobenzoic acid, aminotrichlorophenylacetic acid mixture, or aminotrichlorobenzoic acid mixture. Such a concentration is well above the minimum range of concentration for effective control of Dutch elm disease in vivo by these same compounds. Therefore, it is seen that the mode of action of these compounds cannot be the direct kill of fungal spores.

While the invention is not based on any theory of mode of action, it is suggested that the chemical may somehow prevent the fungus from producing toxins or may neutralize the toxins in some manner. These suggestions are clearly only speculations.

The method of the invention consists, as stated above, of applying a chemotherapeutant amount of the indicated chemical to the tree. The chemotherapeutant amount will vary with the chemical chosen, season, size of tree, and method of application, among other factors, but will generally be in the range of about 0.01 gram to 500 grams per tree, the lower rates being used for small elms with the most active chemicals and more efficient method of application (such as injection), the higher rates for large trees with less efficient methods of application (such as distribution over the soil around the base of the tree).

Methods of application encompassed within the scope of the invention comprise any method for introducing the chemical into the vascular tissue of the trees. Such methods include (but are not limited to) the following:

(1) Dormant spraying of twigs before bud break.
(2) Spraying of foliage.
(3) Injection as a solution into trunk or implantation as a solid into the trunk.
(4) Spraying or painting the trunk, especially near the base, using a penetrating formulation, a solution in an organic solvent (mineral oil, vegetable oil, aliphatic ketones, alcohols, or esters, for example), or water solution, preferably containing wetting agents.
(5) Spraying or distribution of the chemical as a liquid, powder, or granular solid onto the soil surface around the tree, depending on leaching, by rainfall, into the root zone.
(6) Subsurface injection or insertion of the chemical in a liquid or solid form, into the root zone.

This list is not exhaustive; other methods may also be employed to introduce the active agent.

The chemicals used in the methods of the invention may be used in the pure form, but are usually formulated to facilitate application and favor penetration. Such formulations include (a) water solutions of the salts, (b) oil solutions of the free acids, their esters, or their long-chain fatty amine salts, (c) granular formulations of any of the compounds, on a carrier such as clay, vermiculite, or fertilizer, and (d) water/organic solvent emulsions of the free acids or their esters.

For method (1), formulation (b) is most suited. For method (3), formulation (a) is most suited. For method (4), formulations (b) and (d) are most suited. For methods (5) and (6), formulations (a), (c) and (d) are most suited.

For optimum results in prevention of infection in elm trees, the trees should be treated in the late winter or early spring before the adult elm bark beetles emerge. In the case of application technique (5), considerable time may be required for leaching into the root zone and consequently fall or winter treatments may be preferred.

When symptoms (wilting of leaves) indicate that infection has occurred but before it has spread throughout the tree, treatment with the indicated chemotherapeutic agents retards the spread of the infection, and with the infection thus localized, the infected branches may be pruned out.

It is within the scope of the invention to combine the indicated compounds with insecticides such as DDT, systemic phosphate insecticides, systemic carbamate insecticides, or with fungicides such as 8-hydroxyquinoline benzoate, or with fertilizers such as urea, or trace nutrients such as iron salts or chelates.

The following examples are given to further illustrate the invention, but are not to be construed as limiting, except as defined in the appended claims.

*Example 1.—Preparation of 2,3,6-tricloro-5-nitrophenylacetic acid*

A mixture of twenty-five parts of 2,3,6-trichorophenylacetic acid, with one hundred and fifty parts of red fuming nitric acid is allowed to stand at ambient temperature for four hours. An equal volume of water is then added, the mixture is filtered, and washed free of nitric acid.

The pale yellow crystalline product, after drying in air to a constant weight (twenty-six grams), is found to be of adequate purity for use. The melting point is 184.5–185.5 degrees centigrade and the neutralization equivalent (by titration with 0.1 N sodium hydroxide to a phenolphthalein end point) is two hundred and eighty-five (theory, 284.5).

*Analysis (percent by weight).*—Calculated for $$C_8H_4Cl_3NO_4$$

N, 4.92; Cl, 37.5. Found: N, 4.77; Cl, 36.6.

The product may be recrystallized, if desired, from aqueous alcohol to give a purer product melting at one hundred and eighty-five to one hundred and eighty-six degrees centigrade.

The structure was proved by oxidation by potassium permanganate to 2,3,6-trichloro-5-nitrobenzoic acid, having a melting point of 156.5–157 degrees centigrade, which is described in our co-pending application, Serial No. 740,992, now U.S. Patent 3,109,023.

*Example 2.—Preparation of 5-amino-2,3,6-trichlorophenylacetic acid*

A mixture of five parts by weight of 5-nitro-2,3,6-trichlorophenylacetic acid, ten parts of water, thirty-five parts of methanol, and about two parts of commerical Raney nickel catalyst is agitated under hydrogen at forty pounds per square inch pressure for eight hours at twenty to thirty degrees centigrade. The mixture is filtered, evaporated to dryness, and the residue is recrystallized from a benzene-acetone mixture to obtain the desired product as a colorless crystalline solid, melting point 208 to 208.5 degrees centigrade.

*Analysis (percent by weight).*—Calculated for $$C_8H_6O_2Cl_3N$$

Cl, 41.8. Found: Cl, 41.4.

The compound is poorly soluble in water but is soluble in aqueous hydrochloric acid to form the soluble hydrochloride and in aqueous sodium hydroxide to form the soluble sodium salt.

*Example 3.—Preparation of the isopropyl ester and the butoxyethyl ester of aminotrichlorophenylacetic acid*

One hundred parts of mixed isomers of nitrotrichlorophenylacetic acid, containing forty percent 5-nitro-2,3,6-trichloro-isomer, by infrared analysis, are refluxed for two hours with two hundred parts of thionyl chloride, after which the excess thionyl chloride is stripped under aspirator vacuum. The residual liquid acid chloride is added to isopropyl alcohol (two hundred parts), with cooling, at twenty-five to thirty-five degrees. After the exothermic reaction ceases, the mixture is refluxed for three hours, then the excess alcohol is stripped under aspirator vacuum. The dark oil is dissolved in four hundred milliliters of fresh isopropyl alcohol and then treated with hydrogen gas in a shaking autoclave at thirty pounds per square inch pressure (gauge) in the presence of about five percent by weight of Raney nickel catalyst until no further hydrogen uptake occurs.

The mixture is then filtered to remove catalyst, and the solvent is stripped off under aspirator vacuum, leaving an amber syrup, part of which crystallizes on prolonged standing. The infrared spectrum shows the presence of the ester linkage and amino group, and the absence of a nitro group.

*Analysis (percent by weight).*—Calculated for $$C_{11}H_{12}O_2NCl_3$$

N, 4.72. Found: N, 4.6.

By substituting butoxyethanol (commercial "butyl Cellosolve") in place of isopropyl alcohol in the above procedure, the butoxyethyl ester is made. It is a viscous oil having the presence of the expected functional groups indicated by the infrared spectrum.

*Analysis (percent by weight).*—Calculated for $$C_{14}H_{18}O_3NCl_3$$

N, 3.95. Found: N, 3.7.

*Example 4.—Preparation of technical dichloronitrophenylacetic acid*

Fifty parts of a mixed dichlorophenylacetic acid having the approximate isomeric composition of thirty-seven percent 2,5-, twenty-seven percent 2,6-, forty-four percent 2,4-, and eight percent 3,4-dichloro-(based on infrared analysis of the dichlorotoluenes from which it were derived), was mixed with four hundred and fifty parts of red fuming nitric acid and allowed to stand at room temperature for twenty-four hours. The product was isolated as in Example 1, and was a yellowish crystalline solid having a neutralization equivalent of two hundred and fifty (theory, two hundred and fifty-two).

*Example 5.—Preparation of technical trichloronitrophenylacetic acid and trichloroaminophenylacetic acid*

Fifty parts of a mixed trichlorophenylacetic acid having the approximate isomeric composition forty to fifty percent 2,3,6-, twenty to forty percent 2,4,5-, and ten to twenty percent 2,3,5-trichlorophenylacetic acid (based on infrared analysis of the trichlorotoluenes from which it was derived) were mixed with three hundred and seventy-five parts of red fuming nitric acid and allowed to stand at room temperature for twenty-four hours. The product was isolated as in Example 1, and was a yellowish, crystalline solid having a neutralization equivalent of 28.5 (theory, 284.5).

*Analysis (percent by weight).*—Calculated for $$C_8H_4Cl_3NO_4$$

N, 4.92; Cl, 37.5. Found: N, 4.5; Cl, 37.0.

This material could be hydrogenated, as in Example 2, to a mixed aminotrichlorophenylacetic acid, a colorless amorphous solid, soluble in aqueous ammonia and caustic soda.

*Example 6.—Formulation of 2,3,6-trichloro-5-nitrophenylacetic acid*

To a stirred mixture of ten parts of 2,3,6-trichloro-5-nitrophenylacetic acid and fifty to seventy-five parts of water was added five percent sodium hydroxide until a pH of nine was reached, and the mixture was then diluted with water to a total of two hundred parts. The result was a clear solution, containing five percent by weight of equivalent acid as the sodium salt. Solutions of the dimethylammonium salt were made similarly.

*Example 7.—Preparation of 4-amino-2,3,5,6-tetrachlorobenzoic acid*

Ten grams of 4-nitro-2,3,5,6-tetrachlorobenzoic acid (prepared by nitration of 2,3,5,6-tetrachlorobenzoic acid) in 100 grams of methanol were catalytically reduced with 3 grams of Raney nickel at 30 pounds per square inch (gauge) hydrogen pressure in 19 hours.

The solids were filtered out, treated with ammonium hydroxide to dissolve the product, the solution was filtered and the filtrate was acidified. The precipitated product was filtered, recrystallized from methanol and water to obtain 5.2 grams of product of a melting point of 195–196° (decomposition), neutral equivalent of 275 (theory 275), percentage of nitrogen of 5.06 (theory 5.10) and percentage of chlorine of 51.1 (theory 51.7).

*Example 8.—Preparation of methyl 4-amino-2,3,5,6-tetrachlorobenzoate*

A mixture of 100 grams of methyl 4-nitro-2,3,5,6-tetrachlorobenzoate, 1800 milliliters of methanol and Raney nickel catalyst was stirred for 12 hours under 30 pounds per square inch gauge pressure of hydrogen. The cataylst was filtered, the solution evaporated, and the product recrystallized from ethanol to yield 75 grams of colorless solid having a melting point of 137–138° and containing 54.4% chlorine (theory 54.8%).

Example 9

Ten parts of a commercial polychlorobenzoic acid having the approximate composition

|  | Percent |
|---|---|
| 2,5-dichlorobenzoic acid | 12 |
| 2,3,5-trichlorobenzoic acid | 16 |
| 2,3,6-trichlorobenzoic acid | 8 |
| 3,4,5-trichlorobenzoic acid | 2 |
| 2,4,5-trichlorobenzoic acid | 6 |
| 2,3,5,6-tetrachlorobenzoic acid | 36 |
| 2,3,4,5-tetrachlorobenzoic acid | 15 | were heated at 70° with 30 parts of red fuming nitric acid for ten hours, then the reaction mixture was poured into 75 parts of cold water and the precipitated product was filtered out, washed with water, and dried in air. Nitrogen analysis indicated that one nitro group per mole had been thus introduced.

By stirring the product with ten parts of water and by addition of 30 percent aqueous ammonia until a pH of 7 was reached, a clear solution of the ammonium nitropolychlorobenzoate was made.

Example 10

The ammonium salt solution of the preceding example was stirred vigorously under 40 pounds per square inch hydrogen pressure in the presence of 0.1 part of 5% platinum on charcoal hydrogenation catalyst until no further hydrogen uptake occurred. The catalyst was removed by filtration, leaving an aqueous solution of ammonium aminopolychlorobenzoate suitable for use. By acidification to pH 2, the acid could be precipitated as a solid and isolated by filtration.

Example 11

A technical trichlorobenzoic acid having the approximate analysis: 60% 2,3,5-trichlorobenzoic acid; 20% 2,3,6-trichlorobenzoic acid; 10% 2,4,5-trichlorobenzoic acid; 10% other isomers; was nitrated as in the above example to prepare nitrotrichlorobenzoic acid, a light yellowish solid soluble in aqueous ammonia or aqueous dimethylamine solution.

Example 12

By hydrogenation of the above nitrotrichlorobenzoic acid at 25–30° in methanol under 30 pounds per square inch hydrogen pressure in the presence of 0.1 part Raney nickel catalyst, followed by filtration of the catalyst and evaporation of the solvent, a mixed aminotrichlorobenzoic acid, a colorless solid, was produced.

This product, when stirred with ten parts of water and admixed with aqueous ammonia to a pH of 8, dissolved to give a clear aqueous solution.

Example 13

Small elm trees (2.5 inch diameter and twelve to fifteen feet high) were treated in early spring with two grams per tree of 5-amino-2,3,6-trichlorophenylacetic acid, applied by distribution of the chemical as a powder on the soil surface over the root zones of the trees and washed into the soil by repeated frequent watering for a month. The trees were then treated with *Ceratostomella ulmi*.

Two control groups of infected trees were also employed. One group was not treated. The other was treated with two grams (per tree) of 2,3,6-trichlorophenylacetic acid.

The untreated group in later summer showed pronounced symptoms of Dutch elm disease (defoliation, discolored vascular tissue). The group treated with the compound of the invention lacked these symptoms. The group treated with 2,3,6-trichlorophenylacetic acid showed severe leaf curling and most of the trees died.

Example 14

Twenty-five small elm trees are heavily inoculated with spores of *Ceratostomella ulmi* and divided into five groups of five trees. Five trees of each group are sprayed in early spring with one of the following solutions:

(a) One percent dimethylammonium 5-amino-2,3,6-trichlorophenylacetate in water;
(b) One percent diethanolammonium 5-amino-2,3,6-trichlorophenylacetate;
(c) One percent dimethylaurylammonium 5-amino-2,3,6-trichlorophenylacetate in a refined mineral oil;
(d) 0.1 percent isopropyl 5-amino-2,3,6-trichlorophenylacetate in a refined mineral oil.

Five of the inoculated trees are left unsprayed as controls.

In early summer following these treatments, the new growth of the trees was measured. The twenty sprayed trees are found to appear healthy and show no malformations of the leaves. In a dry period of later summer following the treatment, the damaging effects of Dutch elm disease becomes apparent by wilting and partial or complete defoliation in the case of the unsprayed elms; the sprayed elms on the other hand appear healthy and lack these symptoms.

Example 15

Ten elm trees were sprayed to saturate a two foot band of bark at the base of the trunk, using a solution of four pounds of butoxyethyl 2,3,6-trichloro-5-aminophenylacetate per one hundred gallons of non-phytotoxic refined mineral oil, and then were inoculated with the causative fungus of Dutch elm disease. Several unsprayed trees were also inoculated similarly. Four weeks later, the unsprayed trees exhibited severe symptoms (leaf desiccation) of Dutch elm disease, while the treated trees were free of symptoms.

Example 16

Forty-five elm trees approximately three inches in diameter and fifteen feet high and known to be free from Dutch elm disease are divided up into three groups of fifteen trees each. The first group of trees (Group A), is treated with a liter of water containing twenty-five parts per million of the ammonium salt of 5-amino-2,3,6-trichlorophenylacetic acid introduced by way of a funnel into the trees' transpiration stream. The second group of trees (Group B), is similarly treated with a liter of water containing one hundred parts per million of the same compound. The third group of fifteen trees (Group C), is left untreated as a control group. Three weeks after the date of treatment all forty-five trees are challenged by inoculating with the causative fungus of Dutch elm disease. Four weeks later all forty-five trees are examined for symptoms of Dutch elm disease such as "die back" of the tree tissue. The following results are obtained:

| Group | Concentration of Chemical, p.p.m. | Number of Trees with Disease Symptoms |
|---|---|---|
| A | 25 | 8 of 15. |
| B | 100 | 4 of 15. |
| C | 0 (control) | 14 of 15. |

Example 17

Forty-five elm trees approximately three inches in diameter and fifteen feet high and known to be free from Dutch elm disease are divided up into three groups of fifteen trees each. The first group of trees (Group A) is treated with a liter of water containing twenty-five parts per million of the triethylamine salt of amino-trichlorophenylacetic acid (technical isomer mixture as in Example 5) introduced by way of a funnel into the tree's xylem. The second group of trees (Group B) is similarly treated with a liter of water containing one hundred parts per million of the same compound. The third group of fifteen trees (Group C) is left untreated as a control group. Three weeks after the date of treatment all forty-five trees are challenged by inoculating with the causative fungus of Dutch elm disease. Four weeks later all forty-five trees are examined for symptoms of Dutch elm disease such as "die back" of the tree tissue. The following results are obtained:

| Group | Concentration in p.p.m. | Number of Trees With Disease Symptoms |
|---|---|---|
| A | 25 | 7 of 15. |
| B | 100 | 4 of 15. |
| C | 0 (control) | 15 of 15. |

*Example 18*

The trunks of ten 10 foot high elms were treated at bud break (April) with a 2 inch band of a 10 percent dispersion of 4-nitro-2,3,5,6-tetrachlorobenzoic acid in mineral oil at the rate of 0.1 gram acid per tree. After one month, the trees were deliberately infected with spores of *Ceratostomella ulmi*. During the following summer at a time when a control group of untreated but inoculated trees had developed symptoms of the disease, the disease incidence in the treated group was 50% of that in the untreated control group.

*Example 19*

In a test similar to that of the preceding example, ten elms were treated with 0.1 gram each of a mixture of about 45% 5-nitro-2,3,6-trichlorophenylacetic acid, about 35% 3-nitro-2,4,5-trichlorophenylacetic acid, about 15% 5-nitro-2,3,4-trichlorophenylacetic acid, and about 5% 3-nitro-2,4,6-trichlorophenylacetic acid. Ten trees were left untreated as controls, and both groups were inoculated with spores of *Ceratostomella ulmi*. Dutch elm disease incidence in the treated group was reduced by 40 percent relative to the untreated group.

*Example 20*

A mixed aminotrichlorophenylacetic acid containing about 40–50% 5-amino-2,3,6-trichloro-, 25–40% 3-amino-2,4,5-trichloro-, 10–20% 5-amino-2,3,4-trichloro-, and 3–6% 3-amino-2,4,6-trichlorophenylacetic acid was formulated as the ammonium salt by addition of aqueous ammonia to the acid. The solution was diluted with water to a concentration of 100 parts of organic acid per million parts of aqueous solution.

Each of 30 elms of about 4 inches diameter was injected with 1 gallon of the aqueous solution by suspending a siphon bottle on the trunk, said bottle being connected by plastic tubing to a one-hole rubber stopper tightly fitted into a ½" diameter hole bored into the sapwood of the tree. As a result of gravity flow and the transpiration suction of the tree, the liquid was completely siphoned out of the bottle into the sapwood of the tree within a day. A second group of 30 trees was left untreated, for comparison.

Several trees in the treated and untreated groups had been heavily inoculated on one branch with *Ceratostomella ulmi* about a week before the date of the treatment, and disease symptoms (wilting) were evident on the inoculated branches. The remaining trees in both the treated and untreated groups were inoculated a week after treatment.

Two months later, all of the trees in the untreated group were severely wilted and in a dying condition. In the treated group, the trees inoculated after treatment all appeared free of disease symptoms. In the case of the trees inoculated before treatment, the inoculated branches were dead but the remainder of the tree was healthy, indicating that the chemotherapeutant had prevented the spread of the disease from the inoculated to the uninoculated branches.

*Example 21*

Six elms of 3 to 4 inches diameter were subjected to foliar sprays to run-off, using solutions of 2 pounds/100 gallons and 8 pounds/100 gallons of the product of Example 12 as the dimethylamine salt in water. After one week, these trees plus six unsprayed elms of the same size, were heavily inoculated with spores of *Ceratostomella ulmi*. Within two months, the inoculated unsprayed trees had died of Dutch elm disease, whereas the sprayed trees remained alive.

Since various modifications can be made by one of ordinary skill in the art, the invention described above is not to be limited thereto, except as defined in the appended claims.

We claim:

1. A method for the control of vascular tree diseases caused by fungi which comprises applying to the tree a chemotherapeutic amount of a compound selected from the group consisting of compounds of the formula

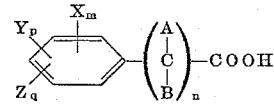

wherein A is chosen from the group consisting of hydrogen, halogen, lower alkoxy, hydroxy, lower alkyl, and keto, B is chosen from the group consisting of hydrogen, halogen, lower alkoxy, and keto, $n$ is an integer from zero to one, X is halogen, $m$ is an integer from 1 to 4, Y is chosen from the group consisting of nitro, amino, acylamino, lower alkyl-substituted amino, furfurylamino, benzylamino, and hydroxylamino, $p$ is an integer from 1 to 2, Z is chosen from the group consisting of lower alkyl, lower alkoxy, lower alkylmercapto, and phenoxy, $q$ is an integer from zero to two, and wherein the sum of $m$, $p$, and $q$ does not exceed five, the salts of said acids, the hydrolyzable esters, amides, anhydrides, thioesters, thioamides, thioanhydrides, acid halides, nitriles, amidines, imides, iminoesters, imidothioesters of said acids and mixtures thereof.

2. The method of claim 1 wherein X is chlorine, Y is nitro, $m$ is 2 to 4, $p$ is 1, $q$ is zero and $n$ is zero.

3. The method of claim 1 wherein X is chloride, Y is nitro, A and B are hydrogen, $m$ is 2 to 4, $p$ is 1, $q$ is zero and $n$ is 1.

4. The method of claim 1 wherein X is chlorine, Y is amino, $m$ is 2 to 4, $p$ is 1, q is zero and $n$ is zero.

5. The method of claim 1 wherein X is chlorine, Y is amino, A and B are hydrogen, $m$ is 2 to 4, $p$ is 1, $q$ is zero and $n$ is 1.

6. A method for the control of fungus-caused vascular tree diseases which comprises applying to the tree a chemotherapeutic amount of 5-nitro-2,3,6-trichlorophenylacetic acid.

7. A method for the control of fungus-caused vascular tree diseases which comprises applying to the tree a chemotherapeutic amount of a salt of 5-nitro-2,3,6-trichlorophenylacetic acid.

8. A method for the control of fungus-caused vascular tree diseases which comprises applying to the tree a chemotherapeutic amount of 5-amino-2,3,6-trichlorophenylacetic acid.

9. A method for the control of fungus-caused vascular tree diseases which comprises applying to the tree a chemotherapeutic amount of a salt of 5-amino-2,3,6-trichlorophenylacetic acid.

10. A method for the control of fungus-caused vascular tree diseases which comprises applying to the tree a chemotherapeutic amount of nitrotrichlorophenylactic acid.

11. A method for the control of fungus-caused vascular tree diseases which comprises applying to the tree a chemotherapeutic amount of a salt of nitrotrichlorophenylacetic acid.

12. A method for the control of fungus-caused vascular tree diseases which comprises applying to the tree a chemotherapeutic amount of aminotrichlorophenylacetic acid.

13. A method for the control of fungus-caused vascular tree diseases which comprises applying to the tree a chemotherapeutic amount of a salt of aminotrichlorophenylacetic acid.

14. A method for the control of fungus-caused vascular tree diseases which comprises applying to the tree a chemotherapeutic amount of nitrotrichlorobenzoic acid.

15. A method for the control of fungus-caused vascular tree diseases which comprises applying to the tree a chemotherapeutic amount of a salt of nitrotrichlorobenzoic acid.

16. A method for the control of fungus-caused vascular tree diseases which comprises applying to the tree a chemotherapeutic amount of aminotrichlorobenzoic acid.

17. A method for the control of fungus-caused vascular tree diseases which comprises applying to the tree a chemotherapeutic amount of a salt of aminotrichlorobenzoic acid.

18. A method for the control of fungus-caused vascular tree diseases which comprises applying to the tree a chemotherapeutic amount of nitrotetrachlorobenzoic acid.

19. A method for the control of fungus-caused vascular tree diseases which comprises applying to the tree a chemotherapeutic amount of a salt of nitrotetrachlorobenzoic acid.

20. A method for the control of fungus-caused vascular tree diseases which comprises applying to the tree a chemotherapeutic amount of aminotetrachlorobenzoic acid.

21. A method for the control of fungus-caused vascular tree diseases which comprises applying to the tree a chemotherapeutic amount of a salt of aminotetrachlorobenzoic acid.

22. A method for the control of fungus-caused vascular tree diseases which comprises applying to the tree a chemotherapeutic amount of aminotrichlorophenylacetic acid mixture containing between about 35 and about 75 percent of 5-amino-2,3,6-trichlorophenylacetic acid.

23. A method for the control of fungus-caused vascular tree diseases which comprises applying to the tree a chemotherapeutic amount of an alkali metal salt of a mixed aminotrichlorophenylacetic acid containing between about 30 and about 75 percent of 5-amino-2,3,6-trichlorophenylacetic acid.

24. A method for the control of fungus-caused vascular tree diseases which comprises applying to the tree a chemotherapeutic amount of an ammonium salt of a mixed aminotrichlorophenylacetic acid containing between about 30 and about 75 percent of 5-amino-2,3,6-trichlorophenylacetic acid.

25. A method for the control of fungus-caused vascular tree diseases which comprises applying to the tree a chemotherapeutic amount of a hydrocarbyl-substituted ammonium salt of a mixed aminotrichlorophenylacetic acid containing between about 30 and about 75 percent of 5-amino-2,3,6-trichlorophenylacetic acid.

26. A method for the control of fungus-caused vascular tree diseases which comprises applying to the tree a chemotherapeutic amount of an alkali metal salt of 5-amino-2,3,6-trichlorophenylacetic acid.

27. A method for the control of fungus-caused vascular tree diseases which comprises applying to the tree a chemotherapeutic amount of the ammonium salt of 5-amino-2,3,6-trichlorophenylacetic acid.

28. A method for the control of fungus-caused vascular tree diseases which comprises applying to the tree a chemotherapeutic amount of a hydrocarbyl substituted ammonium salt of 5-amino-2,3,6-trichlorophenylacetic acid.

29. A method for the control of vascular tree diseases caused by fungi which comprises applying to a tree a chemotherapeutic amount of a compound selected from the group consisting of compounds of the formula

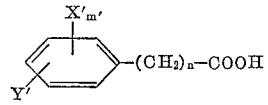

where $n$ is an integer from zero to 1, $X'$ is chosen from the group consisting of bromine and chlorine, $m'$ is a number from 2 to 4, $Y'$ is chosen from the group consisting of nitro and amino, the salts of said acids, the hydrolyzable esters of said acids, and mixtures thereof.

30. The method of claim 29 wherein $X'$ is chlorine, $Y'$ is nitro, $m'$ is 3 to 4 and $n$ is 0.

31. The method of claim 29 wherein $X'$ is chlorine, $Y'$ is nitro, $m'$ is 3 to 4 and $n$ is 1.

32. The method of claim 29 wherein $X'$ is chlorine, $Y'$ is amino, $m'$ is 3 to 4 and $n$ is 0.

33. The method of claim 29 wherein $X'$ is chlorine, $Y'$ is amino, $m'$ is 3 to 4 and $n$ is 1.

34. The method of claim 1 wherein the compound applied to the tree is selected from the group consisting of aminotrichlorophenylacetic acid the salts of said acid and hydrolyzable esters of said acid.

35. The method of claim 1 wherein the compound applied to the tree is selected from the group consisting of aminotrichlorobenzoic acid, the salts of said acid and the hydrolyzable esters of said acid.

36. The method of claim 1 wherein the compound is applied to the twigs before bud break.

37. The method of claim 1 wherein the compound is applied to the trunk of the tree.

38. The method of claim 1 wherein the compound is injected into the sapwood.

39. The method of claim 1 wherein the compound is implanted as a dry solid into the sapwood.

40. The method of claim 1 wherein the compound is applied to elm trees.

41. The method of claim 40 wherein the compound is applied to the elms before the date of emergence of adult winged elm bark beetles.

References Cited by the Examiner

UNITED STATES PATENTS

| | | | |
|---|---|---|---|
| 2,297,557 | 9/1942 | Hester et al. | 167—30 |
| 2,334,556 | 11/1943 | Howard | 167—30 |
| 2,393,673 | 1/1946 | Wyss et al. | 167—30 |
| 2,726,947 | 12/1955 | Baumgartner | 71—2.6 |
| 2,819,293 | 1/1958 | Van der Stelt | 260—468 |
| 3,014,063 | 12/1961 | McLane et al. | 260—471 |

OTHER REFERENCES

Chemical Abstracts, vol. 52, page 16377(g), (1957).
Chemical Abstracts, vol. 51, page 2798(i), (1956).
Chemical Abstracts, vol. 55, page 13749(f), (1960).

JULIAN S. LEVITT, *Primary Examiner.*

GEORGE A. MENTIS, *Assistant Examiner.*

UNITED STATES PATENT OFFICE

CERTIFICATE OF CORRECTION

Patent No. 3,268,394                August 23, 1966

Edward D. Weil et al.

It is hereby certified that error appears in the above numbered patent requiring correction and that the said Letters Patent should read as corrected below.

Column 6, line 71, for "tricloro", in italics, read -- trichloro --, in italics; column 8, line 34, for "28.5" read -- 283.5 --; column 12, line 48, for "chloride" read -- chlorine --; line 74, for "nitrotrichlorophenylactic" read -- nitrotrichlorophenylacetic --.

Signed and sealed this 11th day of June 1968.

(SEAL)
Attest:

Edward M. Fletcher, Jr.

Attesting Officer

EDWARD J. BRENNER

Commissioner of Patents